United States Patent
Bobrov et al.

(10) Patent No.: US 11,783,051 B2
(45) Date of Patent: Oct. 10, 2023

(54) NORMALIZATION, COMPRESSION, AND CORRELATION OF VULNERABILITIES

(71) Applicant: ZeroNorth, Inc., Boston, MA (US)

(72) Inventors: Sergey Bobrov, Larkspur, CA (US); William Tyler Wissemann, Boston, MA (US); Aaron Phillip Wise, Boston, MA (US)

(73) Assignee: ZeroNorth, Inc., Boston, MA (US)

( * ) Notice: Subject to any disclaimer, the term of this patent is extended or adjusted under 35 U.S.C. 154(b) by 70 days.

(21) Appl. No.: 17/376,864

(22) Filed: Jul. 15, 2021

(65) Prior Publication Data

US 2023/0021226 A1    Jan. 19, 2023

(51) Int. Cl.
*H04L 29/06* (2006.01)
*G06F 21/57* (2013.01)

(52) U.S. Cl.
CPC ...... *G06F 21/577* (2013.01); *G06F 2221/033* (2013.01)

(58) Field of Classification Search
CPC .................. G06F 21/577; G06F 21/56; G06F 21/562–565
See application file for complete search history.

(56) References Cited

U.S. PATENT DOCUMENTS

| | | | |
|---|---|---|---|
| 7,299,452 B1 | 11/2007 | Zhang et al. | |
| 7,340,726 B1 | 3/2008 | Chelf et al. | |
| 7,409,376 B2 | 8/2008 | Jameson | |
| 7,797,590 B2 | 9/2010 | Kaksonen | |
| 8,595,845 B2 | 11/2013 | Basavapatna et al. | |
| 9,258,320 B2 | 2/2016 | Hayrynen et al. | |
| 9,262,132 B1 | 2/2016 | Lugton | |
| 9,378,013 B2 | 6/2016 | Tibble | |
| 9,590,880 B2 | 3/2017 | Ashby et al. | |
| 9,612,943 B2 | 4/2017 | Boshernitsan et al. | |

(Continued)

FOREIGN PATENT DOCUMENTS

| | | | |
|---|---|---|---|
| CN | 105629948 A | 6/2016 | |
| WO | WO-2018136941 A1 * | 7/2018 | ............. G06F 21/55 |

OTHER PUBLICATIONS

International Patent Application No. PCT/US2022/037368, International Search Report and Written Opinion dated Nov. 4, 2022, 9 pages.

*Primary Examiner* — Evans Desrosiers
(74) *Attorney, Agent, or Firm* — Han Santos, PLLC (57) ABSTRACT

Methods, systems, and apparatus, including computer programs encoded on a computer storage medium, for normalizing, compressing, and correlating vulnerabilities are disclosed. In one aspect, a method includes the actions of generating a first and second copy of a software target. The actions further include providing the first copy to a first scanning tool and the second copy to a second scanning tool. The actions further include receiving a first scanning tool output that identifies a first issue of the software target. The actions further include receiving a second scanning tool output that identifies a second issue of the software target. The actions further include determining that the first issue and the second issue are a same issue. The actions further include generating a combined issue of the first issue and the second issue. The actions further include outputting a notification that includes the combined issue.

20 Claims, 5 Drawing Sheets

(56) References Cited

U.S. PATENT DOCUMENTS

| | | |
|---|---|---|
| 9,921,952 B2 | 3/2018 | Dean et al. |
| 9,946,525 B2 | 4/2018 | Tibble et al. |
| 10,102,113 B2 | 10/2018 | Browne et al. |
| 10,181,981 B2 | 1/2019 | Degioanni |
| 10,216,611 B2 | 2/2019 | Dillinger |
| 10,255,370 B2 | 4/2019 | Carpenter et al. |
| 10,261,883 B2 | 4/2019 | Tibble et al. |
| 10,303,448 B2 | 5/2019 | Steven et al. |
| 10,346,294 B2 | 7/2019 | Schaik |
| 10,721,275 B2 | 7/2020 | Kung et al. |
| 10,764,273 B2 | 9/2020 | Abdul et al. |
| 2007/0136024 A1 | 6/2007 | Moser et al. |
| 2009/0158385 A1 | 6/2009 | Kim et al. |
| 2013/0269028 A1* | 10/2013 | Nakawatase ........ H04L 63/1433 726/22 |
| 2018/0309747 A1 | 10/2018 | Sweet et al. |
| 2019/0095230 A1 | 3/2019 | Glessner et al. |
| 2019/0130105 A1* | 5/2019 | Quintero Ramirez ....................... G06F 21/561 |
| 2021/0406371 A1* | 12/2021 | Mungre ................. G06F 21/78 |

\* cited by examiner

NORMALIZATION, COMPRESSION, AND CORRELATION OF VULNERABILITIES

BACKGROUND

In computer security, a vulnerability is a weakness that can be exploited by a threat actor, such as an attacker, to cross privilege boundaries such as performing unauthorized actions within a computer system. To exploit a vulnerability, an attacker may need at least one applicable tool or technique that can connect to a system weakness.

Vulnerability management is a cyclical practice that may relate to processes that include discovering assets, assessing or performing a vulnerability scan, reporting on results, prioritizing vulnerabilities, remediating vulnerabilities, and/ or verifying remediation. This process may be continuously repeated as the assets are updated.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Users trying to assess how secure their applications and enterprises are may be faced with a daunting set of issues such as multiple types of artifacts (e.g., source code, containers, etc.), multiple artifacts of each type (e.g., source code repositories, web services, etc.), and/or multiple scanning tools for each type of artifact type (e.g., Nessus, nmap, etc.). Each time a tool scans an artifact, the tool may generate thousands of security issues, which could overwhelm a development-operations (DevOps) team trying to address the issues found. The discussion below addresses this problem by normalizing, compressing, and tracking these potentially large sets of issues to make them both manageable and actionable by distilling them to a set of non-duplicate, relevant issues to remediate.

The system to address this problem may apply event-driven and microservice architecture patterns to orchestrate a process that includes various stages. The system may create and subsequently destroy clones of the software targets to test. This allows the system to create and utilize disposable and safe-to-test instances of the software targets. The system may scan those target clones using one or more scenarios such as scanning tools that may be appropriate for use with the software targets. The system may normalize the output of the scanning tools by parsing and data mapping the outputs. This creates a set of refined (i.e., normalized and compressed) issues from the raw issues generated by the scanning tools. The compression of the refined issues yields a smaller, more actionable set of issues by removing duplicate issues. The system may remove duplicates on a per-target granularity. This compression may be lossy in that some information generated by the scanning tools may be lost. The system may track the scanning tools' detections of issues and the remediations performed by users. The system may create and/or update stateful synthetic issues that can include correlating refined issue results across different scanning tools. The system may make the synthetic issues actionable by transmitting notifications to a user according to a policy.

Users who want to keep up-to-date on the security profile of their applications, which may include home-grown software and third-party software and involve the use of cloud and container technologies, may benefit from using this technique because of the automated orchestration and execution of various scanning tools, coalescing of outputs of the scanning tools, and tracking of actionable issues. Users may utilize these techniques in various scenarios. For repositories that may include custom software, these techniques can manage static application security testing and software composition analysis. For instances that may include home-grown components and third-party components, these techniques can manage dynamic application security testing. For system configurations, these techniques can assist in checking cloud application programming interfaces and virtual private cloud configurations. For containers, these techniques can assist in checking container images for vulnerable libraries and checking the integrity and publisher of images.

Figure 1:
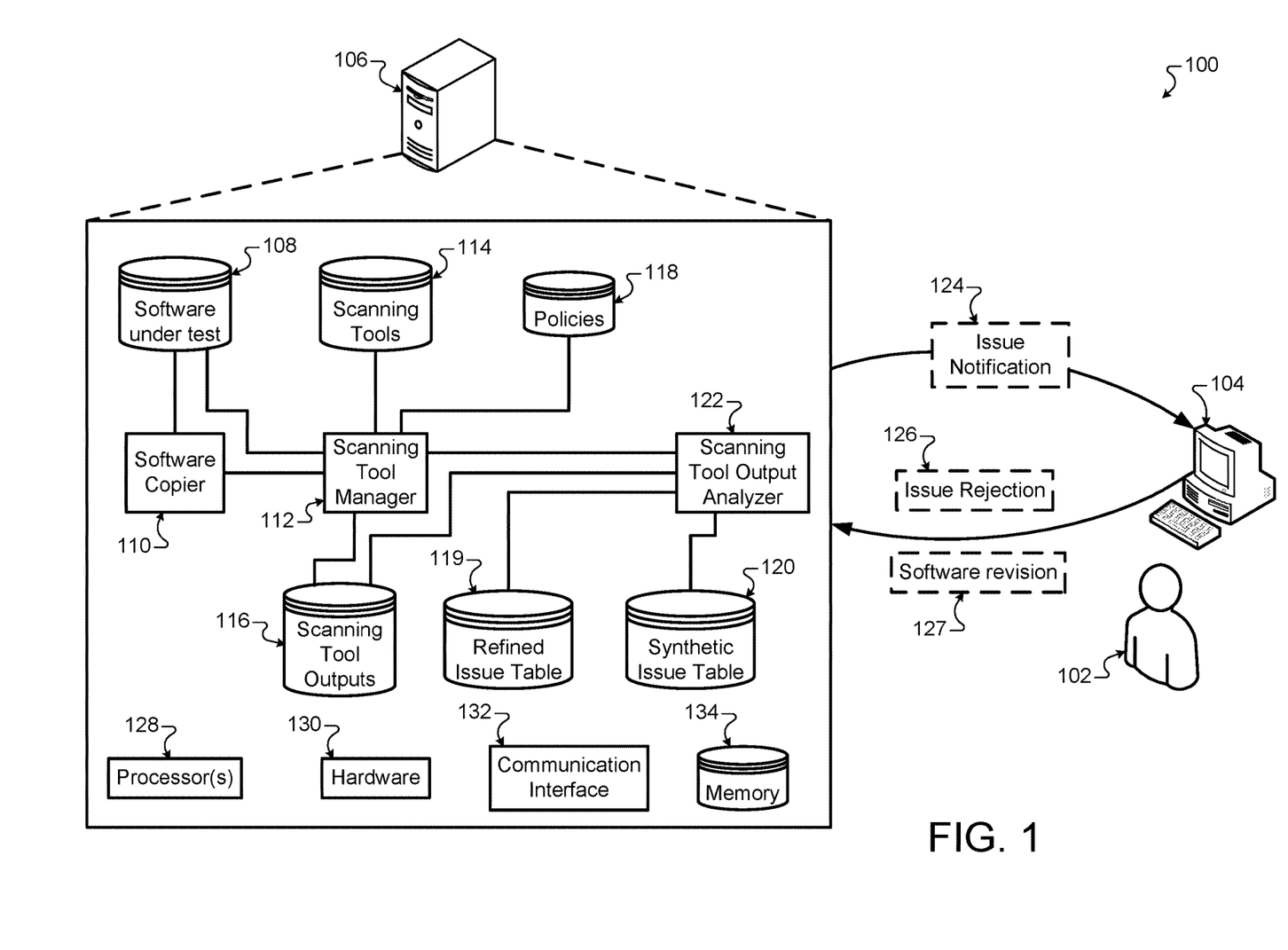
FIG. 1 illustrates an example system that is configured to manage multiple software scanning tools, analyze the output of those software scanning tools, and output notifications to alert a user of any security issues identified by those software scanning tools.

FIG. 1 illustrates an example system 100 that is configured to manage multiple software scanning tools, analyze the output of those software scanning tools, and output notifications to alert a user of any security issues identified by those software scanning tools. Briefly, and as described in more detail below, the system 100 includes a server 106 that is configured to receive software to test using one or more scanning tools. Each scanning tool may identify an issue in a portion of the software. The server 106 may normalize, compress, and correlate those issues and generate actionable items for a user 102 to remediate the issues.

In more detail, the server 106 may receive or access software under test 108. The software under test 108 may be stored locally on the server, stored on a different computing device, and/or stored in the cloud, for example. The software under test 108 may include various types of software such as home-grown software, third-party software, open source software, and/or other similar types of software. The software under test 108 may use cloud and/or container technologies. An example of software that may be included in the software under test 108 may include software stored in repositories. The repositories may include custom software. Another example of software may include instances of, for example, home-grown software components and third-party components. Other examples of software may include the configuration of cloud software and containerized software.

The server 106 may include a scanning tool manager 112 that is configured to access the software under test 108 and a software copier 110. The scanning tool manager 112 may initiate scanning and/or testing of one or more portions of the software under test 108. The scanning tool manager 112 may initiate scanning and/or testing in response to various triggers and/or events. In some implementations, the scanning tool manager 112 may initiate a scan on a periodic basis or according to a schedule. For example, the scanning tool manager 112 may initiate testing of a first portion of the software under test 108 every twenty-four hours. As another example, the scanning tool manager 112 may initiate testing of a second portion of the software under test 108 each Monday and Thursday at 3 am. In some implementations, the scanning tool manager 112 may initiate testing in response to a request from the user 102. For example, the user 102 may update several lines of the code fora portion of the software under test 108 and may request that server 106 initiate testing on the portion of the software under test 108. In some implementations, the scanning tool manager 112 may initiate testing in response to an event. An event may be generated by actions of the server 106 or another computing device. For example, an event may be the uploading of changes code of the software under test 108.

The scanning tool manager 112 may initiate scanning of the software under test 108 by instructing the software copier 110 to make a copy of the portion of the software under test 108 for testing. The scanning tool manager 112 may identify the portion of the software under test 108 based on the event, schedule, and/or request from the user 102. The software copier 110 may generate the software copy by cloning the portion of the software under test 108. The software copy may be disposable and may be a safe-to-test instance of the portion of the software under test 108 in the sense that if the software copy becomes modified then the original version of the software under test 108 is unaffected.

The software copier 110 may provide the software copy to the scanning tool manager 112. The scanning tool manager 112 may access the scanning tools 114. The scanning tool manager 112 may select a scanning tool from the scanning tools 114. The scanning tools 114 may include tools for static application security testing, software composition analysis, dynamic application security testing, container testing, infrastructure testing, and/or any other similar tools. The scanning tools 114 may be configured to identify security issues and/or vulnerabilities in software. Some of the scanning tools 114 may include static application security testing, dynamic application security testing, software composition analysis, container image scanning, web application security scanning, and/or any other similar scanning tools. The scanning tools 114 may output data identifying those security issues and/or vulnerabilities. In some instances, the scanning tools 114 may output data indicating how to remedy the security issue and/or vulnerability.

In some implementations, one or more of the scanning tools 114 may be configured to identify security issues and/or vulnerabilities in software using various techniques. The scanning tools 114 may identify open source components in the software and generate an inventory of the open source components. The scanning tools 114 may identify the appropriate licenses for each of the open source components and confirm that the license is compatible with the policies 118. The scanning tools 114 may also identify whether the open source components have vulnerabilities and whether the software calls those portions of the open source components that have those vulnerabilities. The scanning tools 114 may also analyze the software for vulnerabilities such as storing passwords in plain text.

In some implementations, the one or more scanning tools 114 may analyze source code without executing the software. In some implementations, the one or more scanning tools 114 may analyze the software by executing the software. In some implementations, the one or more scanning tools 114 may use white box testing. In this case, the scanning tool has access to the application from the inside and tests the underlying framework, design, and implementation. In some implementations, the one or more scanning tools 114 may use black box texting. In this case, the scanning tool may simulate a hacker who is attempting to exploit the software from the outside without knowledge of the framework of the software.

The scanning tool manager 112 may identify a type of the software of the portion of the software under test 108. Based on the type of software, the scanning tool manager 112 may select one or more of the scanning tools 114. For example, the scanning tool manager 112 may select the static application security testing tools and software composition analysis tools for repositories. The scanning tool manager 112 may select dynamic application security testing tools for a site or a subnet. The scanning tool manager 112 may select container testing tools for containers. The scanning tool manager 112 may select infrastructure configuration testing for on-demand cloud computing instances.

In some implementations, the scanning tool manager 112 may select one or more scanning tools 114 based on predetermined rules. The scanning tool manager 112 may receive these predetermined rules from a user, such as the user 102. In some implementations, the scanning tool manager 112 may select similar scanning tools to analyze the same software copy. Each of these tools may be configured to analyze the same type of software and identify similar issues. It may be beneficial to have more than one scanning tool of the same type because different scanning tools may have varying strengths and weaknesses when it comes to identifying issues and vulnerabilities in software.

In some implementations, the scanning tool manager 112 may select one or more scanning tools from the scanning tools 114 based on the policies 118. The policies 118 may include various rules and/or requests provided by an owner/developer of the software under test 108. The policies 118 may identify specific scanning tools to select for different types of software. For example, the policies 118 may specify to select a specific scanning tool when scanning repositories. The scanning tool manager 112 may select additional scanning tools to scan repositories, but should select at least the specific scanning tool to comply with the policies 118. In some implementations, a policy may specify the use of a single scanning tool. In this case, the scanning tool manager 112 may comply with a policy by selecting the scanning tool that the policy specifies. There may be multiple policies that specify the same scanning tool.

The scanning tools 114 may store various scanning tools and/or store data for accessing various scanning tools. In some implementations, a third-party computing device may execute a scanning tool. In this case, the scanning tools 114 may store data identifying the identity of the third-party computing device and credentials to access the scanning tool. The scanning tools 114 may provide that data to the scanning tool manager 112. The scanning tool manager 112 may access the third-party computing device and provide the third-party computing device with the software copy. In some implementations, the scanning tools 114 store a scanning tool locally on the server 106. In this case, the scanning tools 114 may provide the local location of the scanning tool to the scanning tool manager 112. The scanning tool manager 112 may access that location and run the scanning tool on the software copy.

In some implementations, the scanning tool manager 112 may request a unique software copy for each selected scanning tool. For example, the scanning tool manager 112 may identify three scanning tools for a portion of the software under test 108. The scanning tool manager 112 may request that the software copier 110 generate three copies of the portion of the software under test 108. In some implementations, the scanning tool manager 112 may request more than one unique software copy based on the selected scanning tools. If a selected scanning tool modifies the software copy during the test, then the scanning tool manager 112 may request a unique software copy for the selecting scanning tool that modifies the software copy. If a selecting scanning tool does not modify the software copy during the test, then the scanning tool manager 112 may execute initially that scanning tool. If there are additional selected scanning tools that may modify the software copy, then the scanning tool manager 112 may provide that software copy to the additional selected scanning tool after the initial scanning tool.

The scanning tool manager 112 may receive outputs and results from each of the selected scanning tools. The scanning tool manager 112 may store the outputs and results in the scanning tool outputs 116. The outputs may come in various forms depending on the scanning tool. Some of the scanning tools may identify security issues or vulnerabilities in the software copy. The output may include a location in the software copy where the issue may be located, such as a file or section of code. In this case, the scanning tool manager 112 may identify the corresponding location in the portion of the software under test 108 and store data identifying that location in the scanning tool outputs 116. Some of the security issues or vulnerabilities that the scanning tools 114 may identify include a tar vulnerability. A tar vulnerability may exist when a user is not properly warned when extracting setuid or setgid files. This may allow a local user or remote attacks to gain privileges. Another example may be a hardcoded credential such as a password. Another example may be a systemd vulnerability. A systemd vulnerability may exist when system-tmpfiles mishandle symlinks present in non-terminal path components. This may allow local users to obtain ownership of arbitrary files via vectors.

In some implementations, the scanning tool manager 112 may store, in the scanning tool outputs, data relating the specific scanning tool that generated each scanning tool output 116. The scanning tool manager 112 may store a timestamp indicating the date and time of the scanning. The scanning tool manager 112 may also store data identifying the portion of the software under test 108 that the selected scanning tool scanned.

The server 106 may include a scanning tool output analyzer 122. The scanning tool output analyzer 122 may be configured to normalize, compress, and correlate the scanning tool outputs 116. By doing so, the scanning tool analyzer 122 is able to distill the issues and vulnerabilities identified by the multiple scanning tools 114 into a group of manageable actions and/or issues that the user 102 may view. Without the scanning tool analyzer 122, the server 106 would output each issue or vulnerability identified by each scanning tool, even when multiple scanning tools identify the same issue or an individual scanning tool identifies multiple instances of the same issue in the same portion of the software under test 108.

The scanning tool output analyzer 122 may be configured to normalize the scanning tool outputs 116. The scanning tool output analyzer 122 may normalize the scanning tool outputs 116 by consuming a set of raw issues identified in the scanning tool outputs 116. Each different scanning tool may output one or more raw issues in a slightly different format. Some scanning tools may output raw issues that identify issues in the software under test 108 by a line number. Other scanning tools may output raw issues that identify a function in the software under test 108. Even other scanning tools may identify issues in the software under test 108 by a different technique. The scanning tool output analyzer 122 translates each raw issue into a similarly formatted normalized issue. The normalized issues may be in a common format so that the scanning tool output analyzer 122 may compare them. A scanning tool may output raw issues that have an arbitrary number of fields. Normalized issues may include a fixed number of fields that may be less than the arbitrary number of fields in the raw issues output by the scanning tool. If the raw issues include more fields than the normalized issues, then some information may be lost when normalizing the raw issues into the normalized issues.

The scanning tool output analyzer 122 may identify similar issues among the normalized issues. Similar issues may be those issues that identify the same portion of the software under test 108 as needing correction and/or that identify the same security vulnerability. The scanning tool output analyzer 122 may compress the issues by removing duplicate issues. For example, a scanning tool may identify a vulnerability in line seventy-two of a portion of the software under test 108 and may identify the same vulnerability in line eighty-three of the portion of the software under test 108. The scanning tool output analyzer 122 may compress those two normalized issues into one refined issue that identifies the vulnerability as being present in the portion of the software under test 108. The refined issues are stored in the refined issues table 119. As another example, a scanning tool may identify a denial-of-service vulnerability in a first package linked to a portion of the software under test 108 and may identify the same denial-of-service vulnerability in a second package linked to the portion of the software under test 108. The scanning tool output analyzer 122 may compress those two normalized issues into one refined issue.

Normalizing and compressing the raw issues may cause a portion of the information in scanning tool outputs 116 to be absent in the refined issues. In other words, the scanning tool output analyzer 122 performs lossy compression. By using lossy compression, the scanning tool output analyzer 122 is able to reduce the number of issues presented to the user 102. This ultimately reduces the information for the user 102 to consider and prevents the user 102 from being overwhelmed by a list of issues that may have repetitive and/or insignificant additional information. With a reduced set of issues, the user 102 may be able to address each issue more easily.

The scanning tool output analyzer 122 may compress the normalized issues on a per target basis. The scanning tool output analyzer 122 may group the issues based on the portion of the software under test 108 that the scanning tools 114 analyzed. For example, the scanning tools 114 may analyze a cloud computing service instance. Each of the scanning tools 114 may identify one or more raw issues in the cloud computing service instance. The scanning tool output analyzer 122 normalizes those raw issues and compresses the normalized issues into a smaller set of refined issues. Each refined issue may identify a single type of issue that may be present at one or more locations in the portion of the software under test 108.

The scanning tool output analyzer 122 may be configured to create synthetic issues based on the scanning tool outputs 116. The scanning tool output analyzer 122 may generate a synthetic issue in multiple scenarios. A first scenario involves the same scanning tool analyzing the same portion of the software under test 108 at different points in time. For example, a scanning tool may analyze a portion of the software under test 108 on Monday. The scanning tool may identify three instances of the same vulnerability in the portion of the software under test 108. The same scanning tool may analyze the same portion of the software under test 108 on Wednesday. The scanning tool may identify two instances of the same vulnerability in the portion of the software under test 108. The scanning tool output analyzer 122 may compress the outputs of the scanning tool on multiple days into a single synthetic issue. The synthetic issue may identify the vulnerability and indicate that the vulnerability is present in the portion of the software under test 108.

A second scenario involves different scanning tools analyzing the same portion of the software under test 108. For example, a scanning tool may analyze a portion of the software under test 108. The scanning tool may identify three instances of the same vulnerability in the portion of the software under test 108. A different scanning tool may identity four instances of the same vulnerability in the portion of the software under test 108. The scanning tool output analyzer 122 may compress the outputs of the scanning tools into a single synthetic issue. The synthetic issue may identify the vulnerability and indicate that the vulnerability is present in the portion of the software under test 108. A third scenario involves a single scanning tool analyzing a portion of the software under test 108 and identifying an instance of a vulnerability.

The scanning tool output analyzer 122 may store data identifying the synthetic issues and any corresponding remediation status in the synthetic issue table 120. The synthetic issue table 120 may store data related to each synthetic issue. Some of this data may include an identification of the corresponding portion of the software under test 108, a timestamp of when a scanning tool identified the issue, a remediation timestamp for the issue output by a scanning tool, and/or a status of the issue. The status of the issue may indicate whether a user has acted upon the issue. If a user acted upon the issue, then the status may indicate that the issue is "resolved". If a user has not acted upon the issue, then the status may indicate "unresolved". In some instances, the status may also indicate that the issue should be ignored. This may be the case if the user 102 requests that server 106 not notify the user 102 of a particular issue.

The scanning tool output analyzer 122 may be configured to output, to the computing device 104, data identifying the issues. The scanning tool output analyzer 122 may output a notification 124 that indicates issues identified by the scanning tools 114 and normalized and compressed by the scanning tool output analyzer 122. The notification 124 may indicate the synthetic issues of the synthetic issue table 120. The notification 124 may also indicate statuses of the synthetic issues.

The user 102 may view the notification 124 on the computing device 104. In addition to the synthetic issues, the notification may include a selectable option for the user to actively reject an issue. In this case, the computing device 104 may provide the server 106 with an issue rejection 126.

The issue rejection 126 may identify the corresponding issue in the notification 124. The scanning tool output analyzer 122 may receive the issue rejection 126 and store data indicating to ignore the synthetic issue in the synthetic issue table 120. The user 102 may actively reject an issue because the issue may be a false positive, which indicates that an identified vulnerability is not an actual vulnerability. The user 102 may reject an issue because the user 102 views the issue as a low priority issue that does not need to be addressed. If the user 102 rejects an issue, then the scanning tool output analyzer 122 may store data in the synthetic issue table 120 that indicates that the corresponding issue should not be included in a future notification 124.

The user 102 may accept the synthetic issues included in the notification 124 by correcting the issue in the software under test 108. In this case, the user 102 may revise the software under test 108 based on the issue identified in the issue notification 124. The software revision 127 may represent the user 102 changing the software under test 108. In this case, the user 102 may not expressly provide data indicating that the user 102 is correcting the issue. Because the user 102 does not expressly provide data indicating correction of the issue, the issue may not be marked as corrected in the synthetic issue table 120.

The scanning tool manager 112 may coordinate additional scans of the software under test 108. The scanning tool manager 112 may coordinate scanning of the same portions that the scanning tools 114 previously scanned. The scanning tool manager 112 may coordinate scanning of different portions that the scanning tools 114 previously scanned. In the case of the scanning tools 114 scanning an unscanned portion of the software under test 108, the scanning tool output analyzer 122 may analyze the outputs of the scanning tools 114 in a manner similar to that described above. In the case of the scanning tools 114 scanning a previously scanned portion of the software under test, the scanning tool output analyzer 122 may update previously identified synthetic issues of the synthetic issue table 120.

As noted above, the user 102 may not expressly provide an indication that the user 102 corrected an issue indicated in the notification 124. During a subsequent scan of a previously scanned portion of the software under test 108, the scanning tools 114 may generate various outputs that identify various issues of the portion of the software under test 108. The scanning tool output analyzer 122 may parse and normalize these issues. If the synthetic issue table 120 includes an issue that is not included in the parsed and normalized issues, then the scanning tool output analyzer 122 may infer that the issue has been corrected. In this case, the scanning tool output analyzer 122 may update the corresponding synthetic issue of the synthetic issue table 120 by indicating that the issue is resolved.

If the synthetic issue table 120 includes an issue that is included in the parsed and normalized issues, then the scanning tool output analyzer 122 may continue to present the corresponding issue in subsequent notifications. However, if the synthetic issue table 120 includes an issue that is marked as rejected based on the previous response of the user 102, then the scanning tool output analyzer 122 may not include the issue in subsequent notifications.

The server 106 may include a communication interface 132, one or more processors 128, memory 134, and hardware 130. The one or more processors may implement the software copier 110, the scanning tool manager 112, and/or the scanning tool output analyzer 122. The communication interface 132 may include communication components that enable the server 106 to transmit data and receive data from devices connected to a wired and/or wireless network. The communication interface 132 may include an interface that is configured to communicate with network access points. The communication interface 132 may receive data that other devices transmit to the network access points and/or transmit data to the network access points for transmission to the other devices. In some implementations, the communication interface 132 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 130 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 134 may be implemented using computer-readable media, such as computer storage media. The memory 134 may store the software under test 108, the scanning tools 114, the scanning tool outputs 116, the policies 118, the refined issue table 119, and/or the synthetic issue table 120. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In some implementations, the data stored in the memory 134 may be stored externally from the server 106.

Figure 2:
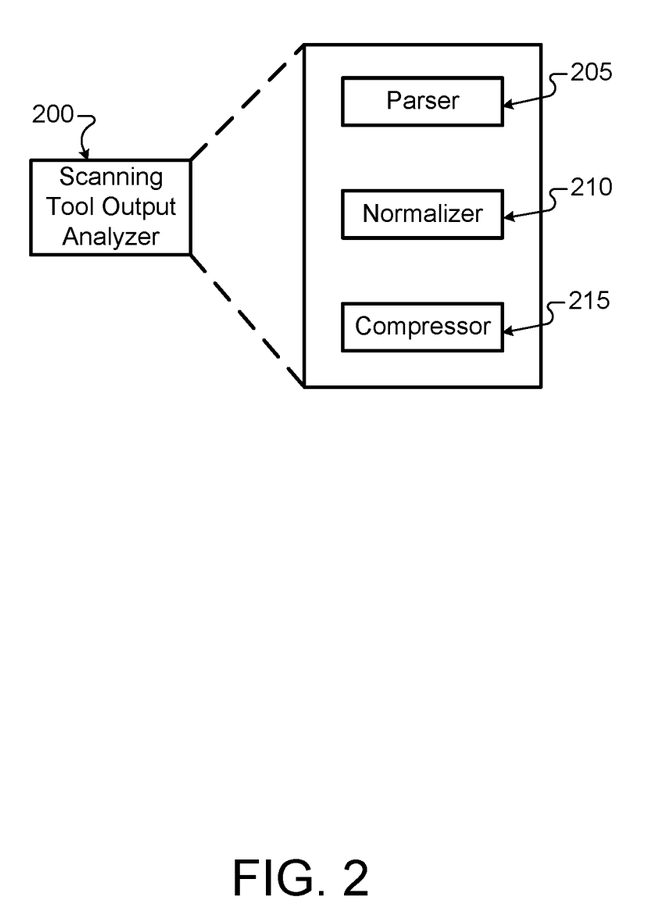
FIG. 2 illustrates an example scanning tool output analyzer that is configured to normalize, compress, and correlate outputs from multiple software scanning tools into notifications that identify the issues identified by those software scanning tools.

FIG. 2 illustrates an example scanning tool output analyzer that is configured to normalize, compress, and correlate outputs from multiple software scanning tools into notifications that identify the issues identified by those software scanning tools. The scanning tool output analyzer 200 may be included in a server, such as server 106 and correspond to the scanning tool output analyzer 122. The server 106 may be any type of computing device that is configured to communicate with other computing devices. The server 106 may communicate with other computing devices using a wide area network, a local area network, the internet, a wired connection, a wireless connection, and/or any other type of network or connection. The wireless connections may include Wi-Fi, short-range radio, infrared, and/or any other wireless connection. Some of the components of the server 106 may be implemented in a single computing device or distributed over multiple computing devices. Some of the components may be in the form of virtual machines or software containers that are hosted in a cloud in communication with disaggregated storage devices.

The scanning tool output analyzer 200 may include a parser 205. The parser 205 is configured to parse outputs from various scanning tools. The outputs may include various raw issues identified by the various scanning tools. The parser 205 may include various modules using techniques for different types of scanning tools. For example, the parser 205 may include a module that is configured to parse the output of a static application security testing scanner. The parser 205 may include another module that is configured to parse the output of a software composition analysis scanner. Each module may be configured to identify the different types of output generated by each type of scanner. In some implementations, the parser 205 may identify each vulnerability outputted by a scanning tool. The parser 205 may identify the severity, summary, details, recommendations, and references of each vulnerability.

In some implementations, the scanning tool may output structured data. In this case, the parser 205 may identify the labels of the structured data and determine the corresponding fields that the parser 205 is configured to identify. In some implementations, the scanning tool may output unstructured data. In this case, the parser 205 may use regular expressions to identify different portions of the output of the scanning tool and relate those portions to the corresponding fields that the parser 205 is configured to identify. In some implementations, the parser 205 may be configured to validate the output from the scanning tool. The parser 205 may validate the output from the scanning tool based on whether the scanning tool generates an error. If the scanning tool generates an error, then the parser 205 may disregard the output of that scanning tool and provide, to the scanning tool manager, data indicating the error and an instruction to run the scanning tool again. If the scanning tool does not generate an error, then the parser 205 may determine whether to validate the output based on the output matching an expected output format for the scanning tool.

The scanning tool output analyzer 200 may include a normalizer 210. The normalizer 210 is configured to support a large quantity of several types of scanning tools, specific scanning tools, and versions of those scanning tools. The normalizer 210 may prepare the outputs of the scanning tools for the compressor 215. In some instances, the normalizer 210 may include a specific Python class for each scanning tool. The normalizer 210 may use branching logic and functions or subroutines to handle the idiosyncrasies of the various scanning tools.

The normalizer 210 may be configured to analyze the parsed issues from the parser 205. The normalizer 210 may generate a normalized issue. The normalized issue is in a standard format that is independent of the scanning tool. In some implementations, the normalizer 210 may pick up the common vulnerabilities and exposures that have been identified in the raw issues. In some instances, the normalizer 210 may bypass inferring the common vulnerabilities and exposures from the raw issues.

The scanning tool output analyzer 200 may include a compressor 215. The compressor 215 may receive the normalized issues from the normalizer 210. The compressor 215 may be configured to reduce the number of normalized issues by removing duplicate issues. Duplicate issues may be those that report the same vulnerability. The compressor 215 may be configured to generate three different types of issues. These may include refined issues, synthetic issues, and supplemental issues.

The compressor 215 may generate refined issues by analyzing the normalized issues generated from the scanning of a single software target by a single scanning tool. From the raw issues generated by the scanning tool, the parser 205 and the normalizer 210 may generate a normalized issue for each of the raw issues that the scanning tool identified. Some normalized issues may identify the same type of issue that appears in multiple locations in the software target. The compressor 215 may compress these normalized issues into a single refined issue. The compressor 215 may generate a refined issue for each type of issue identified by the scanning tool.

The compressor 215 may generate synthetic issues using one of two techniques. A first technique may include analyzing the normalized issues generated from scanning a single software target using at least two scanning tools. The scanning tools may each generate raw issues. The parser 205 and the normalizer 210 may generate normalized issues for each of these raw issues. Some of these normalized issues may identify the same type of issue that may be present in the software target. Because the normalized issues may be based on raw issues from different scanning tools, two normalized issues may correspond to the same issue in the software target. In some instances, this issue may be present in other locations in the software target. The compressor 215 may compress the normalized issues that correspond to this same issue into a single synthetic issue.

A second technique may include analyzing the normalized issues generated from scanning a single software target using a single scanning tool at different points in time, for example one day apart. The scanning tool may generate a first set of raw issues from the first scan and a second set of raw issues from the second scan. The parser 205 and the normalizer 210 may generate normalized issues for each of these raw issues. Some of these normalized issues may identify the same issue that may be present in the software target. Some normalized issues may identity the same issue that the scanning tool detected during each scan. The compressor 215 may compress the normalized issues that correspond to the same issue into a single synthetic issue. A single synthetic issue may represent the same issue that was detected during each scan and other instances of that issue that may be present in the first or second scan.

Figure 3:
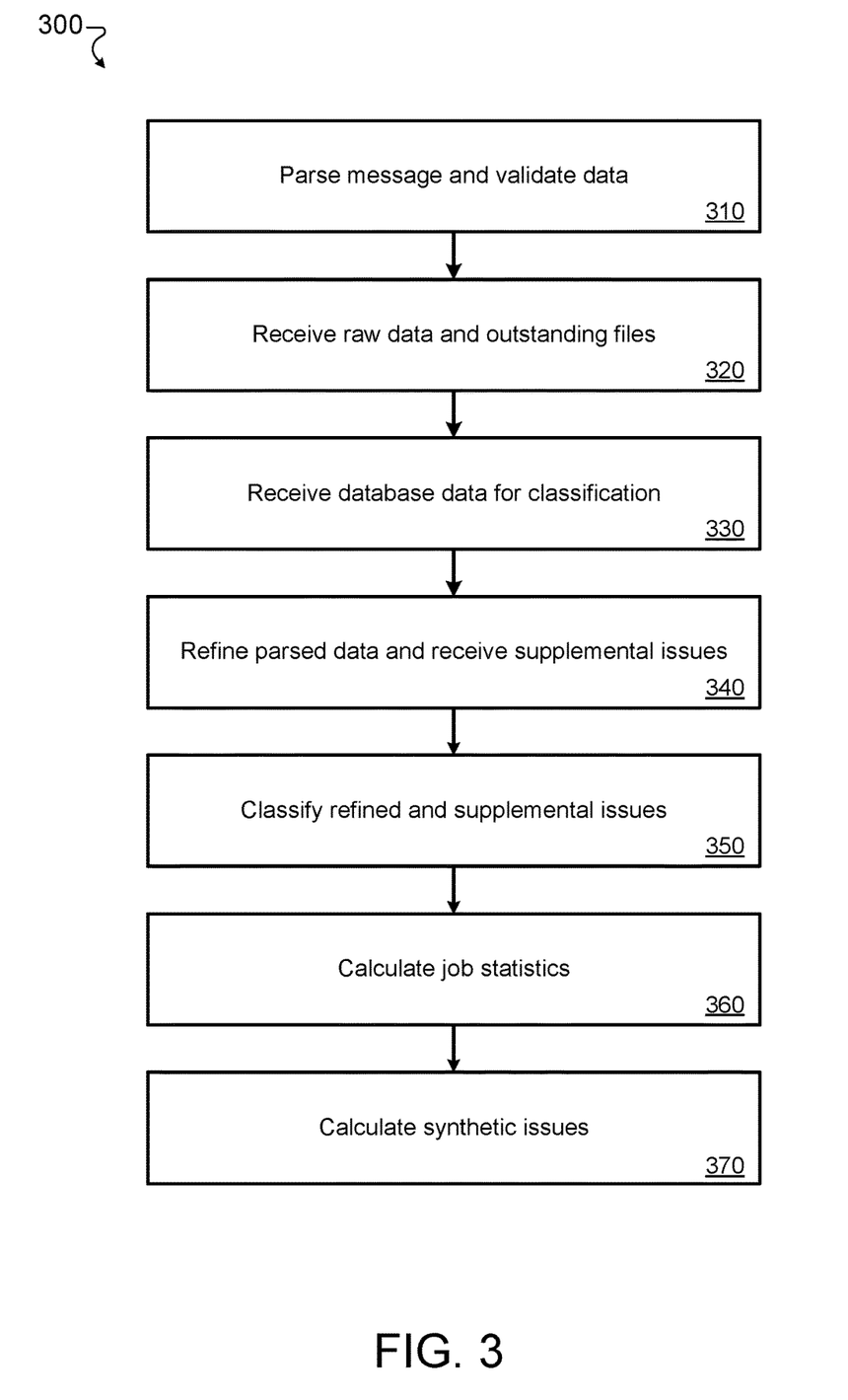
FIG. 3 is a flowchart of an example process for analyzing outputs from software scanning tools.

FIG. 3 is a flowchart of an example process 300 for analyzing outputs from software scanning tools. In general, the process 300 analyzes outputs from various scanning tools that scanned a same portion of the software. The process 300 normalizes the outputs by converting the outputs into a similar format. The process 300 compresses the normalized outputs by removing duplicate outputs. The process 300 generates and outputs notifications that allow the user to view the issues present in the software without presenting the user with duplicates of the same issue. The process 300 will be described as being performed by the scanning tool output analyzer 122 of the server 106 of FIG. 1 and/or the scanning tool output analyzer 200 of FIG. 2 and will include references to other components in FIG. 1.

The scanning tool output analyzer 122 parses a message and validates data (310). The message may be an output from a scanning tool. The output may identify a vulnerability in the software target. The output may include a severity, summary, details, recommendations, and/or references for the vulnerability. Outputs from different scanning tools may be in different formats. Some outputs may be structured, and other outputs may be unstructured. The scanning tool output analyzer 122 may relate the portions of the structured outputs to the standard categories for the scanning tool output analyzer 122. The scanning tool output analyzer 122 may use regular expressions to parse unstructured outputs and assign one of the standard categories to the parsed output.

The scanning tool output analyzer 122 may also validate the messages from the scanning tools. The scanning tool output analyzer 122 may validate a message if the scanning tool does not output an error. If the scanning tool does not output an error, then the scanning tool output analyzer 122 may validate the message if the format is in an expected format for that particular scanning tool. The scanning tool output analyzer 122 may be able to access data indicating an expected format for the output of the various scanning tools.

The scanning tool output analyzer 122 receives raw data and outstanding files (320). The raw data may include the parsed data. The scanning tool output analyzer 122 may receive raw data from each scanning tool that scanned the software target. For example, if there are ten scanning tools to scan a software target, then the scanning tool output analyzer 122 receives an output from each scanning tool when the scanning tool identifies an issue. The scanning tool output analyzer 122 parses those outputs.

The scanning tool output analyzer 122 receives database data for classification (330). The database data for classification may include data that the scanning tool output analyzer 122 may use to classify the parsed data. The scanning tool output analyzer 122 may classify the parsed data according to the software target scanned to generate the corresponding raw data. In some implementations, the scanning tool output analyzer 122 may classify the parsed data based on the type of issue identified by the parsed data. In some implementations, the scanning tool output analyzer 122 may classify the parsed data based on the type of software target.

The scanning tool output analyzer 122 refines parsed data and receives supplemental issues (340). The scanning tool output analyzer 122 may refine the parsed data that may include parsed issues by generating refined issues. The scanning tool output analyzer 122 may generate refined issues by analyzing parsed issues generated by multiple scanning tools analyzing the same software target. The scanning tool output analyzer 122 determines which parsed issues identify the same vulnerability and generates a refined issue that represents the parsed issues that identified the same vulnerability when scanning the same software target. In some implementations, the scanning tool output analyzer 122 generates supplemental issues. The supplemental issues may identify an issue type of a corresponding raw issue.

The scanning tool output analyzer 122 classifies refined and supplemental issues (350). The scanning tool output analyzer 122 may assign a category to each issue. The category may be presented to the user so that issues in a similar category can be grouped together for the user to view and determine whether to act on the issues. The scanning tool output analyzer 122 may classify the issues according to a type of the issue, the software target that the issue corresponds to, the type of software target, the severity of the issue, the time that the issue has been unresolved, whether the issue was previously marked as one to ignore, whether the issue was previously present and now appears to be resolved, and/or any other similar classification.

The scanning tool output analyzer 122 calculates job statistics (360). The job statistics may relate to the types and frequency of issues identified by the scanning tool output analyzer 122. For example, the job statistics may include a number of different types of issues identified by the refined issues. The job statistics may include the number of issues identified in each software target and/or the number of refined issues that correspond to each software target. The job statistics may identify a number of refined issues of each severity level. The job statistics may identify a period of time that each refined issue has been present in the corresponding software target.

The scanning tool output analyzer 122 calculates synthetic issues (370). The scanning tool output analyzer 122 may generate the synthetic issues by analyzing the normalized issues generated by one or more scanning tools analyzing the same software target. The scanning tool output analyzer 122 determines which normalized issues identify the same vulnerability in the software target and generates a synthetic issue to represent these normalized issues.

In some implementations, the scanning tool output analyzer 122 may generate the refined issues as a first step before generating the synthetic issues. In this case, the scanning tool output analyzer 122 may generate the synthetic issues based on the refined issues. The scanning tool output analyzer 122 may generate the refined issues using the technique described above. The scanning tool output analyzer 122 may generate the synthetic issues by analyzing the refined issues to identity those refined issues that identify the same vulnerability in the software target.

Figure 4:
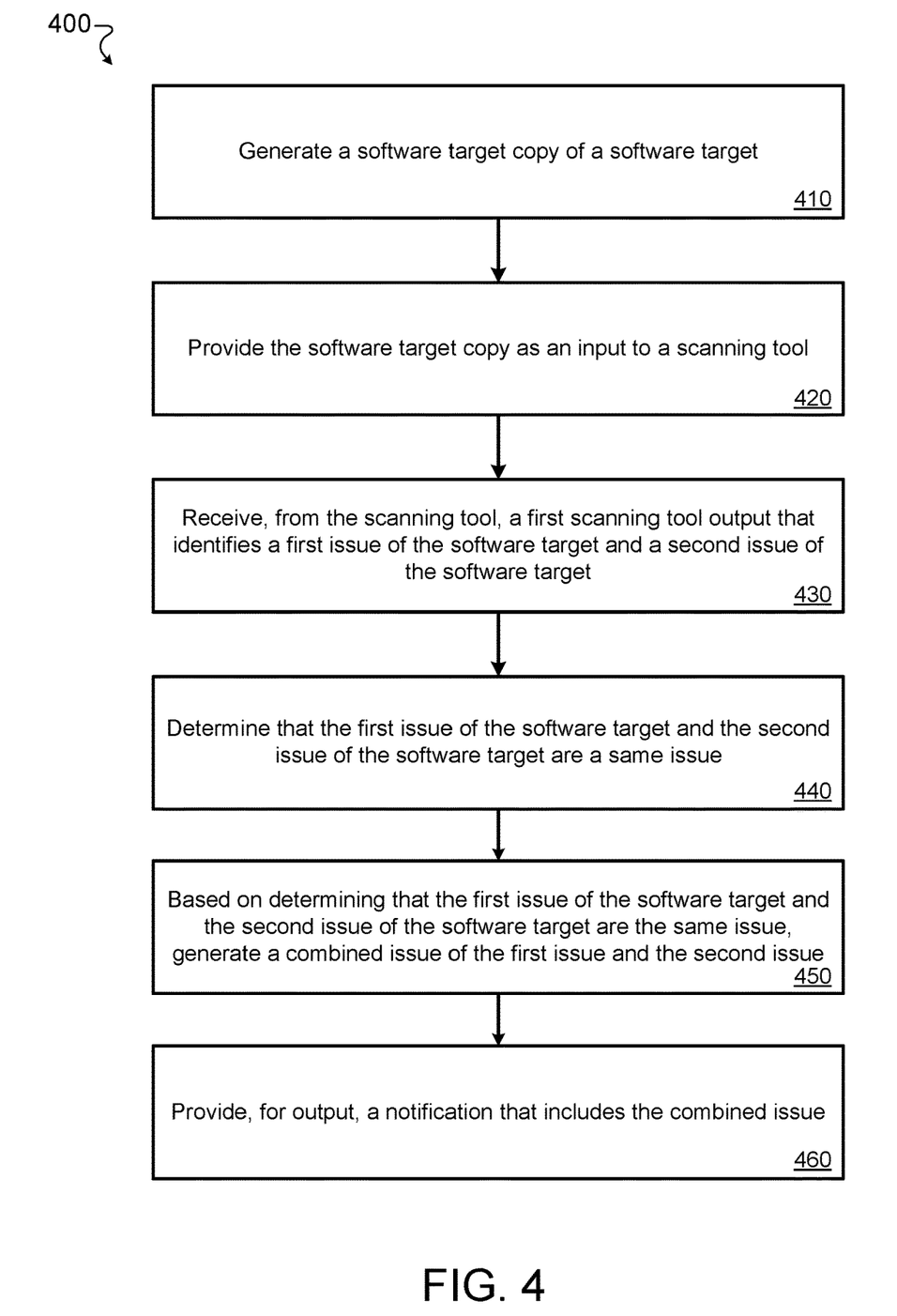
FIG. 4 is a flowchart of a process for managing a software scanning tool, analyzing the output of the software scanning tool, and outputting notifications to alert a user of any security issues identified by the software scanning tool.

FIG. 4 is a flowchart of a process 400 for managing a software scanning tool, analyzing the output of the software scanning tool, and outputting notifications to alert a user of any security issues identified by the software scanning tool. In general, the process 400 includes identifying software to test for security issues and other vulnerabilities using a scanning tool. The process 400 generates a copy of the software. The process 400 analyzes the outputs of the scanning tool and compresses them into actionable items to provide to a user. The process 400 outputs the actionable items to the user. The process 400 will be described as being performed by the server 106 of FIG. 1 and will include references to other components in FIG. 1.

The server 106 generates a software target copy of a software target (410). In some implementations, the number of copies that the server 106 generates is based on the number of scanning tools that will analyze the software target. In this case, there is one scanning tool, so the server 106 generates a single software target copy.

The server 106 provides the software target copy as an input to a scanning tool (420). In some implementations, the server 106 selects the scanning tool based on the software target. For example, if the software target is a repository, then the server 106 may select a static application security testing scanning tool. In some implementations, the server 106 may include various policies. The policies may specify which scanning tools to select. For example, a policy may specify to select a specific scanning tool. The server 106 may receive the policies from users.

The server 106 receives, from the scanning tool, a scanning tool output that identifies a first issue of the software target and a second issue of the software target (430). In some implementations, the server 106 may delete the first software target copy after receiving the scanning tool output. The scanning tool output may identify one or more issues of the software target. Each issue may identify one or more vulnerabilities of the software target. A vulnerability may include a severity of the vulnerability, a summary of the vulnerability, details of the vulnerability, recommendations to correct the vulnerability, and/or references for the vulnerability. The issues identified by the scanning tool may be considered raw issues.

The server 106 determines that the first issue of the software target and the second issue of the software target are a same issue (440). Based on determining that the first issue of the software target and the second issue of the software target are the same issue, the server 106 generates a combined issue of the first issue and the second issue (450). The server 106 provides, for output, a notification that includes the combined issue (460). The server 106 may parse and normalize first issue and the second issue of the scanning tool output. The server 106 compares normalized first issue and the normalized second issue. If the normalized first issue and the normalized second issue identify the same issue or vulnerability, then the server 106 may compress the issue into a single combined issue, which may be referred to as a refined issue.

In some implementations, the server 106 may compare the scanning tool output to outputs from additional scanning tools. The additional scanning tools may analyze another copy of the software target. The server 106 may determine whether the issues identified by the additional scanning tools are the same or different than the issues identified by the normalized first issue and the normalized second issue. If the issues are different, then the server 106 may generate a refined or synthetic issue that represents the different issue. If the issues are the same, then the server 106 may generate a synthetic issue that represents the issue identified by the additional scanning tool, the normalized first issue, and the normalized second issue.

Figure 5:
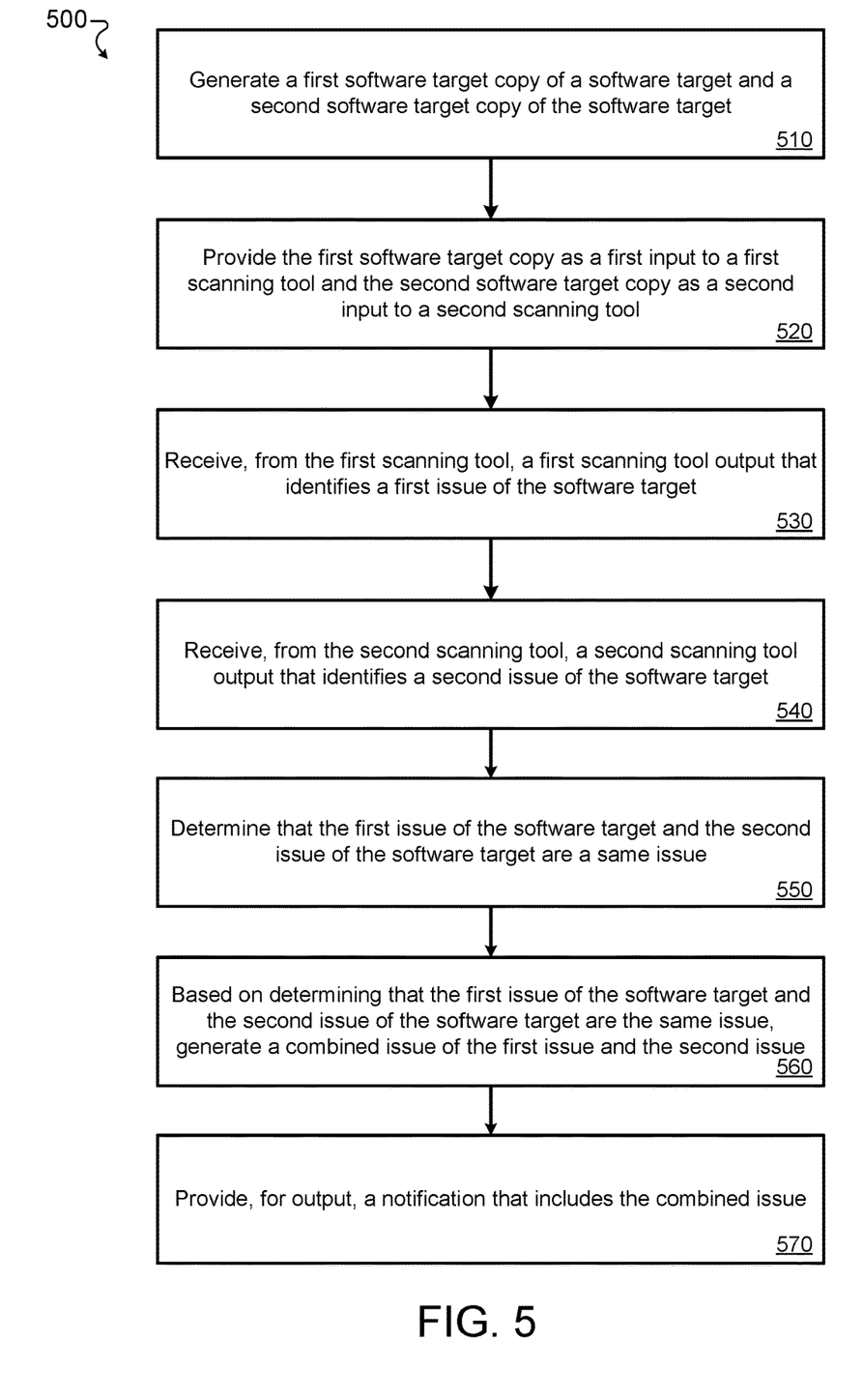
FIG. 5 is a flowchart of a process for managing multiple software scanning tools, analyzing the output of those software scanning tools, and outputting notifications to alert a user of any security issues identified by those software scanning tools.

FIG. 5 is a flowchart of a process 500 for managing multiple software scanning tools, analyzing the output of those software scanning tools, and outputting notifications to alert a user of any security issues identified by those software scanning tools. In general, the process 500 includes identifying software to test for security issues and other vulnerabilities using various scanning tools. The process 500 generates a copy of the software for each scanning tool. The process 500 analyzes the outputs of each scanning tools and compresses them into actionable items to provide to a user. The process 500 outputs the actionable items to the user. The process 500 will be described as being performed by the server 106 of FIG. 1 and will include references to other components in FIG. 1.

The server 106 generates a first software target copy of a software target and a second software target copy of the software target (510). In some implementations, the server 106 may generate multiple copies of the software target depending on the number of scanning tools that will be scanning the software target. For example, if the server 106 determines to scan the software copy using three scanning tools, then the server 106 may generate three copies of the software target.

The server 106 provides the first software target copy as an input to a first scanning tool and the second software target copy as a second input to a second scanning tool (520). In some implementations, the server 106 selects the first scanning tool and the second scanning tool based on the software target. For example, if the software target is a repository, then the server 106 may select static application security testing scanning tools. In some implementations, the server 106 may include various policies. The policies may specify which scanning tools to select. For example, a policy may specify to select all the available scanning tools when scanning repositories. The server 106 may receive the policies from users.

The server 106 receives, from the first scanning tool, a first scanning tool output that identifies a first issue of the software target (530). The server 106 receives, from the second scanning tool, a second scanning tool output that identifies a second issue of the software target (540). In some implementations, the server 106 may delete the first software target copy and the second software target copy after receiving the first scanning tool output and the second scanning tool output. The first scanning tool output and the second scanning tool output may identify one or more issues of the software target. Each issue may identify one or more vulnerabilities of the software target. A vulnerability may include a severity of the vulnerability, a summary of the vulnerability, details of the vulnerability, recommendations to correct the vulnerability, and/or references for the vulnerability. The issues identified by the first and second scanning tool may be considered raw issues.

The server 106 determines that the first issue of the software target and the second issue of the software target are a same issue (550). Based on determining that the first issue of the software target and the second issue of the software target are the same issue, generating, by the computing device, a combined issue of the first issue and the second issue (560). The server 106 may parse and normalize the first scanning tool output and the second scanning tool output. The server 106 compares the normalized first scanning tool output and the normalized second scanning tool output. If the first scanning tool output and the second scanning tool output identify the same issue or vulnerability, then the server 106 may compress the issue into a single combined issue, which may be referred to as a synthetic issue.

In some implementations, the server 106 may compare the first scanning tool output and the second scanning tool output to outputs from additional scanning tools. The additional scanning tools may analyze another copy of the software target. The server 106 may determine whether the issues identified by the additional scanning tools are the same or different than the issues identified by the first scanning tool output and the second scanning tool output. If the issues are different, then the server 106 may generate an additional synthetic issue. If the issues are the same, then the server 106 may bypass generating an additional synthetic issue.

The server 106 provides, for output, a notification that includes the combined issue (560). The notification may include actionable items that a user may select to reject the corresponding issue. If the user rejects the issue, then the server 106 may update a synthetic issue table that stores the synthetic issues and the corresponding status. If a synthetic issue is identified as rejected, then the server 106 may not present that issue to the user after subsequent scans of the software target. The user may correct the issue by updating the software target. The server 106 may infer that the issue has been corrected and update the synthetic issue in the synthetic issue table 120 to be resolved. The server 106 may infer that the issue has been corrected if the issue does not appear in subsequent scans of the software target.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
generating, by a computing device, a first software target copy of a software target and a second software target copy of the software target;
providing, by the computing device, the first software target copy as a first input to a first scanning tool and the second software target copy as a second input to a second scanning tool;
receiving, by the computing device and from the first scanning tool, a first scanning tool output that identifies a first issue of the software target;
receiving, by the computing device and from the second scanning tool, a second scanning tool output that identifies a second issue of the software target;
determining, by the computing device, that the first issue of the software target and the second issue of the software target are a same issue;
based on determining that the first issue of the software target and the second issue of the software target are the same issue, generating, by the computing device, a combined issue of the first issue and the second issue;
determining, by the computing device, whether the combined issue is associated with a label that indicates to bypass outputting a given notification identifying the combined issue based on receiving data from a user indicating to reject a previous issue that was the same as the combined issue; and
based on determining that the same issue is not associated with the label that indicates to bypass outputting the given notification identifying the same issue, providing, for output by the computing device, a notification that includes the combined issue.

2. The method of claim 1, comprising:
deleting, by the computing device, the first software target copy and the second software target copy.

3. The method of claim 1, comprising:
selecting, by the computing device, the first scanning tool and the second scanning tool based on the software target.

4. The method of claim 1, wherein determining that the first issue of the software target and the second issue of the software target are a same issue comprises:
parsing, by the computing device, the first issue and the second issue;
normalizing, by the computing device, the parsed first issue and the parsed second issue; and
comparing, by the computing device, the normalized first issue and the normalized second issue.

5. The method of claim 1, comprising:
storing, by the computing device, data indicating the combined issue;
providing, by the computing device, a third software target copy as a third input to a third scanning tool;
receiving, by the computing device and from the third scanning tool, a third scanning tool output that identifies a third issue of the software target;
determining, by the computing device, that the third issue of the software target and the combined issue are the same issue; and
based on determining that the third issue of the software target and the combined issue are the same issue, bypassing providing, for output by the computing device, an additional notification that includes the third issue.

6. The method of claim 1, comprising:
 storing, by the computing device, data indicating the combined issue;
 providing, by the computing device, a third software target copy as a third input to the first scanning tool;
 receiving, by the computing device and from the first scanning tool, a third scanning tool output that does not identify the first issue; and
 based on the third scanning tool output of the first scanning tool not identifying the first issue, storing, by the computing device, data indicating that the combined issue is resolved.

7. The method of claim 1, comprising:
 receiving, by the computing device, a policy for selecting scanning tools from multiple scanning tools; and
 selecting, by the computing device, the first scanning tool and the second scanning tool based on the policy.

8. The method of claim 1, comprising:
 receiving, by the computing device, data indicating to bypass providing, for output, an additional notification that includes an issue that is the same as the first issue or the second issue.

9. The method of claim 1, wherein the first issue or the second issue include data that is not included in the combined issue.

10. The method of claim 1, wherein the computing device uses an event-driven and microservice architecture to interact with the first scanning tool and the second scanning tool.

11. A system, comprising:
 one or more processors; and
 memory including a plurality of computer-executable components that are executable by the one or more processors to perform a plurality of actions, the plurality of actions comprising:
  generating, by a computing device, a first software target copy of a software target and a second software target copy of the software target;
  providing, by the computing device, the first software target copy as a first input to a first scanning tool and the second software target copy as a second input to a second scanning tool;
  receiving, by the computing device and from the first scanning tool, a first scanning tool output that identifies a first issue of the software target;
  receiving, by the computing device and from the second scanning tool, a second scanning tool output that identifies a second issue of the software target;
  determining, by the computing device, that the first issue of the software target and the second issue of the software target are a same issue;
  based on determining that the first issue of the software target and the second issue of the software target are the same issue, generating, by the computing device, a combined issue of the first issue and the second issue;
  determining, by the computing device, whether the combined issue is associated with a label that indicates to bypass outputting a given notification identifying the combined issue based on receiving data from a user indicating to reject a previous issue that was the same as the combined issue; and
  based on determining that the same issue is not associated with the label that indicates to bypass outputting the given notification identifying the same issue, providing, for output by the computing device, a notification that includes the combined issue.

12. The system of claim 11, wherein the actions comprise:
 deleting, by the computing device, the first software target copy and the second software target copy.

13. The system of claim 11, wherein the actions comprise:
 selecting, by the computing device, the first scanning tool and the second scanning tool based on the software target.

14. The system of claim 11, wherein determining that the first issue of the software target and the second issue of the software target are a same issue comprises:
 parsing, by the computing device, the first issue and the second issue;
 normalizing, by the computing device, the parsed first issue and the parsed second issue; and
 comparing, by the computing device, the normalized first issue and the normalized second issue.

15. The system of claim 11, wherein the actions comprise:
 storing, by the computing device, data indicating the combined issue;
 providing, by the computing device, a third software target copy as a third input to a third scanning tool;
 receiving, by the computing device and from the third scanning tool, a third scanning tool output that identifies a third issue of the software target;
 determining, by the computing device, that the third issue of the software target and the combined issue are the same issue; and
 based on determining that the third issue of the software target and the combined issue are the same issue, bypassing providing, for output by the computing device, an additional notification that includes the third issue.

16. The system of claim 11, wherein the actions comprise:
 storing, by the computing device, data indicating the combined issue;
 providing, by the computing device, a third software target copy as a third input to the first scanning tool;
 receiving, by the computing device and from the first scanning tool, a third scanning tool output that does not identify the first issue; and
 based on the third scanning tool output of the first scanning tool not identifying the first issue, storing, by the computing device, data indicating that the combined issue is resolved.

17. The system of claim 11, wherein the actions comprise:
 receiving, by the computing device, a policy for selecting scanning tools from multiple scanning tools; and
 selecting, by the computing device, the first scanning tool and the second scanning tool based on the policy.

18. The system of claim 11, wherein the actions comprise:
 receiving, by the computing device, data indicating to bypass providing, for output, an additional notification that includes an issue that is the same as the first issue or the second issue.

19. The system of claim 11, wherein the first issue or the second issue include data that is not included in the combined issue.

20. One or more non-transitory computer-readable media of a computing device storing computer-executable instructions that upon execution cause one or more computers to perform acts comprising:
 generating, by a computing device, a first software target copy of a software target and a second software target copy of the software target;

providing, by the computing device, the first software target copy as a first input to a first scanning tool and the second software target copy as a second input to a second scanning tool;

receiving, by the computing device and from the first scanning tool, a first scanning tool output that identifies a first issue of the software target;

receiving, by the computing device and from the second scanning tool, a second scanning tool output that identifies a second issue of the software target;

determining, by the computing device, that the first issue of the software target and the second issue of the software target are a same issue;

based on determining that the first issue of the software target and the second issue of the software target are the same issue, generating, by the computing device, a combined issue of the first issue and the second issue;

determining, by the computing device, whether the combined issue is associated with a label that indicates to bypass outputting a given notification identifying the combined issue based on receiving data from a user indicating to reject a previous issue that was the same as the combined issue; and based on determining that the same issue is not associated with the label that indicates to bypass outputting the given notification identifying the same issue, providing, for output by the computing device, a notification that includes the combined issue.

\* \* \* \* \*